(12) United States Patent  
Diamant

(10) Patent No.: US 8,706,839 B2
(45) Date of Patent: *Apr. 22, 2014

(54) VIRTUAL SERIAL PORT AND PROTOCOL FOR USE IN SERIAL-OVER-LAN COMMUNICATION

(75) Inventor: Nimrod Diamant, Ksar-Saba (IL)

(73) Assignee: Intel Corporation, Santa Clara, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 13/369,439

(22) Filed: Feb. 9, 2012

(65) Prior Publication Data

US 2012/0143990 A1    Jun. 7, 2012

Related U.S. Application Data

(63) Continuation of application No. 11/027,917, filed on Dec. 30, 2004, now Pat. No. 8,150,973.

(51) Int. Cl.
*G06F 15/16* (2006.01)

(52) U.S. Cl.
USPC .......................................................... 709/217

(58) Field of Classification Search
USPC ............... 709/217, 250; 710/5–19, 31, 62–74
See application file for complete search history.

(56) References Cited

U.S. PATENT DOCUMENTS

| | | | |
|---|---|---|---|
| 4,539,655 A | 9/1985 | Trussell et al. | |
| 4,792,896 A | 12/1988 | Maclean et al. | |
| 5,581,715 A | 12/1996 | Verinsky et al. | |
| 5,812,820 A | 9/1998 | Loram | |
| 5,889,965 A | 3/1999 | Wallach et al. | |
| 6,530,050 B1 | 3/2003 | Mergard | |
| 6,606,164 B1 | 8/2003 | Irie et al. | |
| 6,826,387 B1 | 11/2004 | Kammer | |
| 6,834,326 B1 | 12/2004 | Wang et al. | |
| 6,881,096 B2 | 4/2005 | Brown et al. | |
| 7,003,563 B2 | 2/2006 | Leigh et al. | |
| 7,043,205 B1 | 5/2006 | Caddes et al. | |
| 7,155,512 B2 | 12/2006 | Lean et al. | |
| 7,162,638 B2 | 1/2007 | Yoshihiro | |
| 7,284,278 B2 | 10/2007 | Anson et al. | |
| 7,400,648 B2 | 7/2008 | Cromer et al. | |
| 7,457,847 B2 | 11/2008 | Ramey | |
| 7,543,277 B1 | 6/2009 | Righi et al. | |
| 7,721,013 B2 | 5/2010 | Diamant | |

(Continued)

OTHER PUBLICATIONS

"Intelligent Platform Management Interface Specification", version 2, revision 1, section 1, 14 and 15, Feb. 12, 2004.*

(Continued)

*Primary Examiner* — Shirley Zhang
(74) *Attorney, Agent, or Firm* — Christopher K. Gagne

(57) ABSTRACT

A method and system of conveying data to a remote computer, which may act as a management console. A virtual communications port is provided to a central processing unit. The virtual communications port is provided using a device distinct from the central processing unit, such as a network controller card with manageability features inborn. The device providing the virtual communications port receives the data written to the virtual communications port. Thereafter, the device transmits the data into a network, addressed for reception by the remote computer. The remote computer may be used as a management console so that keystrokes entered thereupon may be relayed through the virtual communications port to the aforementioned central processing unit.

19 Claims, 10 Drawing Sheets

(56) References Cited

U.S. PATENT DOCUMENTS

| | | | |
|---|---|---|---|
| 7,949,798 | B2 | 5/2011 | Diamant |
| 7,986,844 | B2 | 7/2011 | Diamant et al. |
| 8,150,973 | B2 | 4/2012 | Diamant |
| 2002/0054029 | A1 | 5/2002 | Glancy et al. |
| 2003/0061401 | A1 | 3/2003 | Luciani |
| 2003/0105850 | A1 | 6/2003 | Lean et al. |
| 2003/0172171 | A1* | 9/2003 | Ueno ................. 709/230 |
| 2003/0194908 | A1 | 10/2003 | Brown et al. |
| 2003/0229727 | A1 | 12/2003 | Wang |
| 2004/0128412 | A1 | 7/2004 | Harrison |
| 2004/0177264 | A1 | 9/2004 | Anson et al. |
| 2004/0181590 | A1 | 9/2004 | Liou et al. |
| 2004/0249985 | A1 | 12/2004 | Mori et al. |
| 2005/0015430 | A1 | 1/2005 | Rothman et al. |
| 2006/0059336 | A1* | 3/2006 | Miller et al. ............. 713/165 |
| 2006/0149860 | A1 | 7/2006 | Diamant |
| 2006/0168099 | A1 | 7/2006 | Diamant |
| 2007/0005821 | A1 | 1/2007 | Diamant |
| 2007/0005828 | A1 | 1/2007 | Diamant |
| 2007/0005867 | A1 | 1/2007 | Diamant |
| 2008/0244212 | A1 | 10/2008 | Rothman et al. |
| 2011/0196970 | A1 | 8/2011 | Diamant |

OTHER PUBLICATIONS

Office Action received for U.S. Appl. No. 13/088,116, mailed Jun. 6, 2012; 24 pages.
"IPMI—Intelligent Platform Management Interface Specification Second Generation V2.0", Table of Contents; Document Revision 1.0, GTPP Standard # 17, Feb. 12, 2004, 23 pages.
"Secure Hash Standard", Federal Information Processing Standards Publication 180-1, Apr. 17, 1995, 18 pages.
Notice of Allowance received for U.S. Appl. No. 11/027,754, mailed on Feb. 10, 2011, 6 pages.
Office Action received fro the U.S. Appl. No. 11/027,754, mailed on Sep. 23, 2010, 18 pages.
Office Action received for U.S. Appl. No. 11/027,754, mailed on Mar. 15, 2010, 20 pages.
Office Action received for U.S. Appl. No. 11/027,754, mailed on Aug. 8, 2007, 24 pages.
Office Action received for U.S. Appl. No. 11/027,754, mailed on May 8, 2008, 26 pages.
Office Action received for U.S. Appl. No. 11/027,754, mailed on Dec. 9, 2008, 9 pages.
Office Action received for U.S. Appl. No. 11/027,754, mailed on Jun. 2, 2009, 9 pages.
Response to Office Action for U.S. Appl. No. 11/027,754 , filed on Jul. 15, 2010, 20 pages.
Response to Office Action received for U.S. Appl. No. 11/027,754, filed on Jan. 31, 2008, 42 pages.
Response to Office Action for U.S. Appl. No. 11/027,754, filed on Jun. 17, 2008, 10 pages.
Response to Office Action for U.S. Appl. No. 11/027,754, filed on Mar. 9, 2009, 25 pages.
Response to Office Action received for U.S. Appl. No. 11/027,754, filed on Jun. 24, 2009, 16 pages.
Supplemental Response to Office Action for U.S. Appl. No. 11/027,754 , filed on Dec. 28, 2009, 10 pages.
Response to Office Action received for U.S. Appl. No. 11/027,754, filed on Jan. 24, 2011, 10 pages.
Notice of Allowance received for U.S. Appl. No. 11/027,917, mailed on Nov. 10, 2011, 17 pages.
Response to Office Action for U.S. Appl. No. 11/027,917, filed on Feb. 25, 2011, 15 pages.
Office Action received for U.S. Appl. No. 11/027,917, mailed on Oct. 29, 2010, 20 pages.
Office Action received for U.S. Appl. No. 11/027,917, mailed on Dec. 24, 2009, 23 pages.
Office Action received for U.S. Appl. No. 11/027,917, mailed on May 25, 2011, 18 pages.
Office Action received for U.S. Appl. No. 11/027,917, mailed on Jun. 22, 2010, 19 pages.
Office Action received for U.S. Appl. No. 11/027,917, mailed on Sep. 4, 2008, 16 pages.
Office Action received for U.S. Appl. No. 11/027,917, mailed on Apr. 15, 2009, 23 pages.
Office Action received for U.S. Appl. No. 11/027,917, mailed on Aug. 31, 2009, 13 pages.
Supplemental Amendment for U.S. Appl. No. 11/027,917, filed on Dec. 28, 2009, 8 pages.
Response to Office Action for U.S. Appl. No. 11/027,917, filed on Feb. 26, 2010, 11 pages.
Response to Office Action and Request for Continued Examination for U.S. Appl. No. 11/027,917, filed on Mar. 29, 2011, 15 pages.
Response to Office Action for U.S. Appl. No. 11/027,917, filed on Sep. 22, 2010, 12 pages.
Response to Office Action for U.S. Appl. No. 11/027,917, filed on Jan. 5, 2009, 15 pages.
Response to Office Action for U.S. Appl. No. 11/027,917, filed on Jun. 12, 2009, 12 pages.
Response to Office Action for U.S. Appl. No. 11/027,917, filed on Oct. 9, 2009, 11 pages.
Response to Office Action received for U.S. Appl. No. 11/027,917, filed on Mar. 29, 2010, 11 pages.
Office Action for U.S. Appl. No. 11/286,513 mailed on Jan. 26, 2011, 16 pages.
Office Action received for U.S. Appl. No. 11/286,513, mailed on Jul. 15, 2010, 11 pages.
Office Action received for U.S. Appl. No. 11/286,513, mailed on May 4, 2010, 14 pages.
Notice of Allowance received for U.S. Appl. No. 11/286,513, mailed on Mar. 30, 2011, 7 pages.
Office Action received for U.S. Appl. No. 11/286,513, mailed on Nov. 5, 2010, 11 pages.
Response to Office Action for U.S. Appl. No. 11/286,513, filed on Mar. 9, 2011, 8 pages.
Response to Office Action for U.S. Appl. No. 11/286,513, filed on Jun. 10, 2010, 8 pages.
Response to Office Action for U.S. Appl. No. 11/286,513, filed on Jan. 3, 2011, 10 pages.
Response to Office Action and Request for Continued Examination for U.S. Appl. No. 11/286,513, filed on Sep. 15, 2010, 11 pages.
Notice of Allowance received for the U.S. Appl. No. 11/804,836, mailed on Dec. 28, 2009, 7 pages.
Office Action received for U.S. Appl. No. 11/804,836, mailed on Mar. 18, 2009, 10 pages.
Office Action received for U.S. Appl. No. 11/804,836, mailed on Sep. 17, 2009, 9 pages.
Response to Office Action and Request for Continued Examination for U.S. Appl. No. 11/804,836, filed on Nov. 12, 2009, 15 pages.
Response to Office Action for U.S. Appl. No. 11/804,836, filed on Jun. 16, 2009, 12 pages.
Supplemental Response to Office Action for U.S. Appl. No. 11/804,836, filed on Dec. 28, 2009, 8 pages.
"MegaRAC M200 OPMA Based Remote Management Controller", Data Sheet, American Megatrends, Northbelt Parkway, Norcross GA 30071, Aug. 22, 2005, 2 pages.
Microsoft, "Virtual PC 2004 Evaluation Guide", Nov. 2003, pp. 1-20.
Response to Office Action for U.S. Appl. No. 11/027,917, filed on Aug. 25, 2011, 15 pages.
Response to Office Action received for U.S. Appl. No. 13/088,116, filed on Aug. 15, 2012, 9 pages.
Notice of Allowance received for U.S. Appl. No. 13/088,116, mailed on Nov. 8, 2012.

* cited by examiner

VIRTUAL SERIAL PORT AND PROTOCOL FOR USE IN SERIAL-OVER-LAN COMMUNICATION

CROSS-REFERENCE TO RELATED APPLICATIONS

This application is a continuation of prior co-pending U.S. patent application Ser. No. 11/027,917 filed Dec. 30, 2004.

TECHNICAL FIELD

Embodiments of the present invention relate to computing systems that may utilize serial-over-LAN communication schemes, and more particularly to computing systems that may utilize a serial-over-LAN communication scheme with a virtual serial port and a protocol tailored for such an application.

BACKGROUND

Oftentimes, it is the case that when a computing system requires a diagnostic or maintenance procedure, keystrokes must be entered into the computing system. For example, to update a setting in the basic input/output system (BIOS) of a computing system, a user must typically be present at the system to enter keystrokes into the BIOS screens. Of course, other sorts of diagnostic or maintenance procedures require the same form of keystroke input.

In the context of a large network of computers, such as in a workplace environment with many offices, it may be cumbersome and expensive to generate even simple keystroke input to a computing system. In such circumstances, information technology (IT) professionals may physically travel to the computer in need of diagnostics or maintenance in order to use its keyboard and monitor. This option is time consuming, and may be expensive. Alternatively, an IT professional may attempt to telephonically direct a computer user who is physically in the presence of the computer, so that the computer user can enter the keystrokes using the computer's keyboard. Again, this option may be error-prone and time consuming.

To address the aforementioned issue, some computing systems allow for text-mode screen data to be redirected to a serial port, and allow for keystroke data to be redirected from the serial port. FIG. 1 depicts such a computing system 100. The computing system 100 includes a central processing unit (CPU) 102, which redirects data (such as text-mode screen data) through a universal asynchronous receiver/transmitter (UART) 104 to a baseboard management controller 106. A baseboard management controller 106 is a system that controls environmental variables of the computing system 100 (e.g., monitors and controls the temperature of the computing system 100). The baseboard management controller 106 includes a microcontroller 108, which is coupled to another UART 110. Thus, the CPU 102 may redirect data through the UART 104, which serializes the data, which travels through a switch 112 (further discussion of the switch 112 follows) that directs the data through another UART 110. The second UART 110 deserializes the data, and communicates the data to the microcontroller 108 on the baseboard management controller 106. Thus, the microcontroller 108 may communicate text-mode screen data to a local area network (LAN) 114 via a network interface card (NIC) 116. In reverse fashion, keystroke data may be received via the LAN 114, and redirected to the CPU 102 via the UARTs 104 and 110.

The switch 112 may direct data from the CPU 102 to either the microcontroller 108 on the baseboard management controller 106 or to a serial communications port connector (COM port connector) 118. The COM port connector 118 is a physical arrangement of pins (such as a DB-9 or DB-25 connector, used with an RS-232 serial port) usually accessible from the exterior of the computing system 100. The state of the switch 112 is under the control of the microcontroller 108. When the switch 112 provides connectivity to the COM port 118, the COM port 118 may be utilized as any ordinary COM port 118 would otherwise be used. When the switch 112 provides connectivity to the microcontroller 108 (via the UART 110), the COM port is unavailable for use. Therefore, the COM port 118 is unavailable for use when the CPU 102 is redirecting text-mode screen data or keystroke data through the baseboard management controller 106.

The aforementioned scheme exhibits certain shortcomings. The inclusion of the switch 112 adds complexity and cost for the design of the baseboard management controller 106. Moreover, the need to manage the state of the switch 112 adds complexity to the software/firmware executed by the microcontroller 108. Additionally, data redirected from the CPU 102 to the microcontroller 108 is limited in data rate by the baud rate supported by the UARTs 104 and 110.

For the foregoing reasons, it is evident that there exists a need for a redirection scheme that addresses one or more of the aforementioned shortcomings.

DETAILED DESCRIPTION

Figure 1:
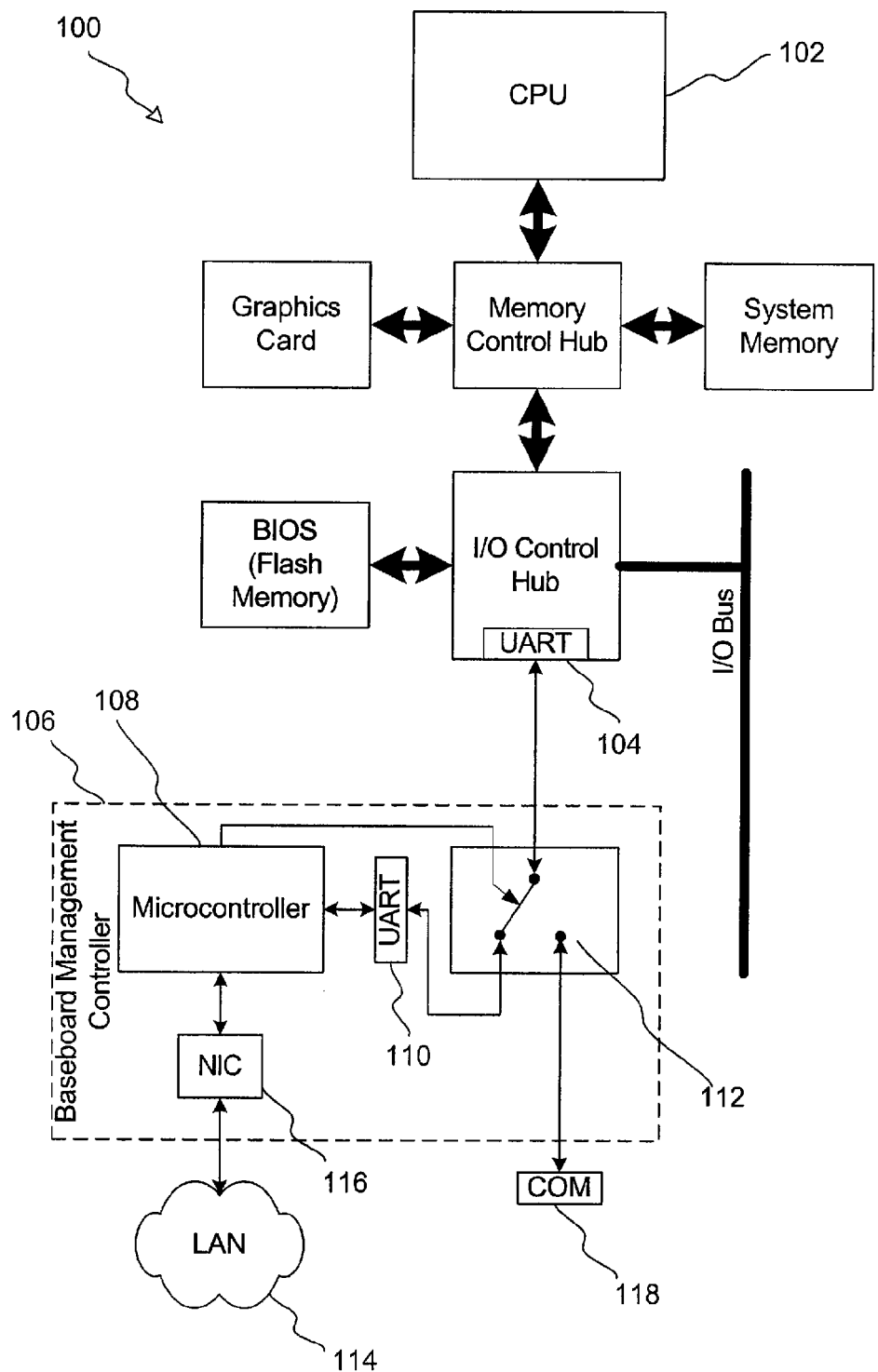
FIG. 1 depicts a prior-art computing system that can redirect text-mode screen data through a UART.
Figure 2:
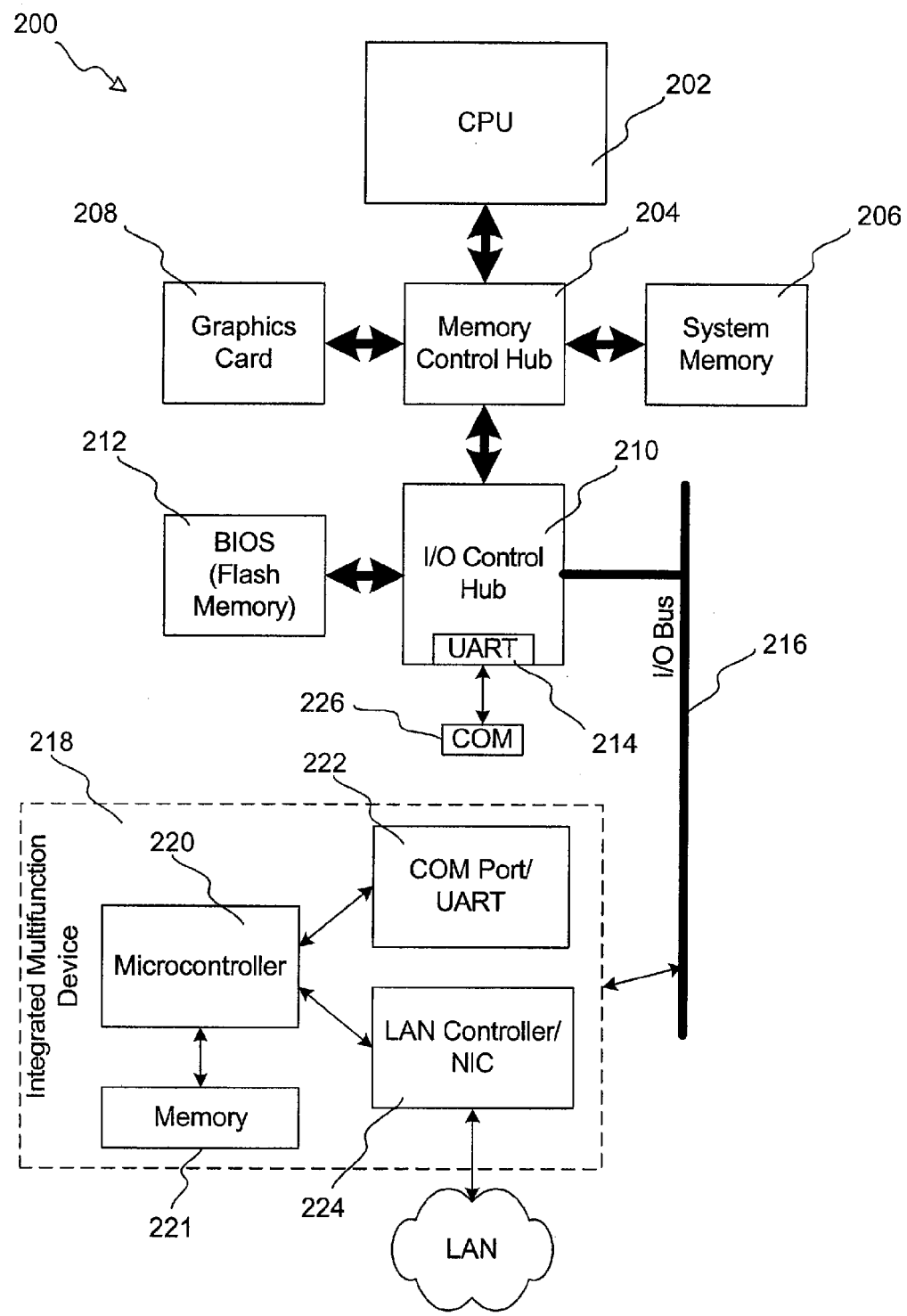
FIG. 2 depicts one embodiment of a computing system that can redirect data via an integrated multifunction device.

FIG. 2 depicts one example of a computing system 200 that redirects text-mode screen data and keystroke data without making use of a switch. The computing system 200 includes a CPU 202, which is coupled to a memory control hub 204. The memory control hub 204 is an arrangement of circuitry that manages and controls access to the system memory 206, graphics card 208, and the input/output (I/O) control hub 210. The I/O control hub 210, in turn, manages and controls access to a flash memory device 212, which stores the basic input/output system (BIOS). It also manages and controls access to a UART 214, which may be embodied as a part of the I/O control hub 210, and manages and controls access to an I/O bus 216, such as a peripheral component interconnect (PCI) bus. (The I/O control hub 210 may also manage and control access to audio channels, USB ports, and other I/O devices that are known in the art, but are not important in the context of this disclosure, and are not depicted herein).

Coupled to the I/O bus 216 is an integrated multifunction device 218. As discussed in more detail below, an integrated multifunction device is a single device that provides more than one function. In the particular example depicted in FIG. 2, the integrated multifunction device 218 is a single device that offers a COM port (i.e., serial port) function and a LAN controller function. Such an integrated multifunction device 218 may be presented in the marketplace as a LAN controller with built-in manageability features.

The integrated multifunction device 218 may include a microcontroller 220 coupled to a UART 222 and a LAN controller 224. Alternatively, the UART 222 circuitry may be physically absent, and present in a virtual sense only, as discussed below. The UART function includes a set of twelve registers (not depicted in FIG. 2) that are accessible by the CPU 202. The registers serve as an vehicle for interacting with the COM port function and software running on the CPU 202. In other words, data is read from and written to the COM port function by reading from and writing to one of the twelve registers. Further, the behavior of the COM port function is controlled by writing to and reading from the remaining seven registers.

Notably, in one embodiment, the integrated multifunction device 218 does not actually contain a UART or a COM port. Rather, the integrated multifunction device 218 contains a set of twelve registers that appear, from the vantage of the CPU 202, to be COM port registers of an ordinary COM port. Firmware or software running on the microcontroller 220 controls the registers in a manner so as to mimic the behavior of a COM port with a device coupled thereto, although no such COM port or device is actually present. Such an arrangement of registers and firmware or software may be referred to as a "virtual COM port" herein. In this way, software running on the CPU 202 may be structured so as to interface with the registers as though they were a vehicle to interact with an actual COM port, although no physical COM port exists.

Figure 3:
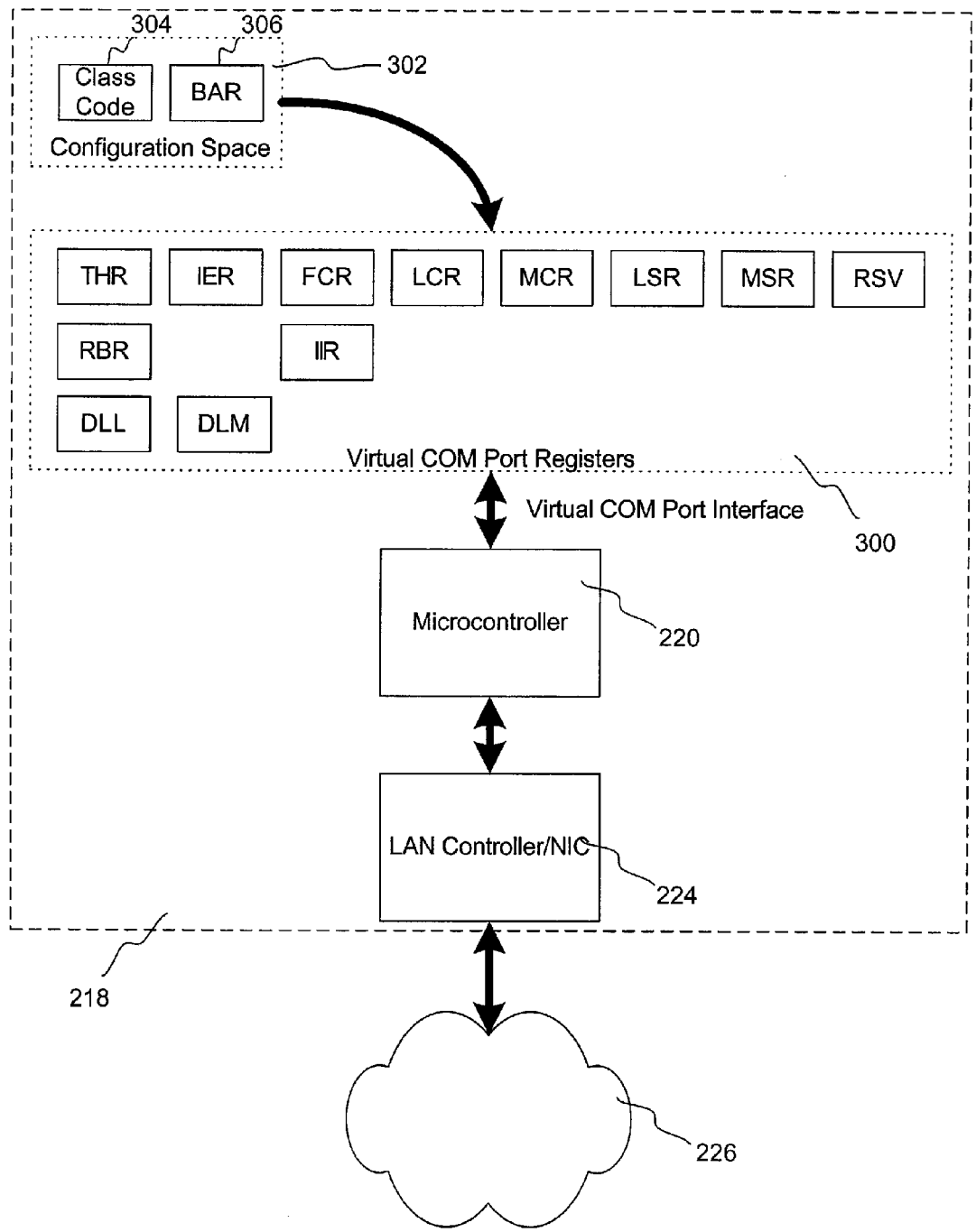
FIG. 3 depicts one embodiment of an integrated multifunction device with a set of virtual COM port registers.

FIG. 3 depicts the integrated multifunction device 218 in greater detail, including a virtual COM port registers 300. The microcontroller 220 residing on the integrated multifunction device 218 is coupled to the virtual COM port registers 300, which may include twelve registers, accessible through eight I/O addresses. The registers are: the transmit/hold register (THR), the interrupt enable register (IER), the interrupt identification register (IIR), the line control register (LCR), the modem control register (MCR), the line status register (LSR), the modem status register (MSR), a reserved register (RSV), a receiver buffer register (RBR), a FIFO control register (FCR), a divisor latch register—least significant byte (DLL), and a divisor latch register—most significant byte (DLM). Other implementations of COM ports may possess a greater or lesser number of registers, having different functions. Such implementations are within the scope of this disclosure.

Each of the aforementioned registers is typically assigned a particular function in the context of an ordinary COM port. Briefly, their functions are as follows. The transmit/hold register (THR) is generally used to store an outgoing data byte, and is write-only. The receiver buffer register (RBR) contains an incoming data byte, and is read-only. The THR and RBR registers share an I/O address. An attempt to read from the shared I/O address results in a read from the RBR register; an attempt to write thereto results in a write to the THR register.

The interrupt enable register (IER) is generally used to enable and disable interrupts that may be generated during use of the associated COM port.

The interrupt identification register (IIR) is generally used to identify the source of a given interrupt, and is read-only. The FIFO control register (FCR) controls internal FIFO operation in the UART, and is write-only. The IIR and FCR registers share an I/O address. An attempt to read from the shared I/O address results in a read from the IIR register; an attempt to write thereto results in a write to the FCR register.

The line control register (LCR) is generally used to store the communication parameter settings (parity, number of stop bits, etc.). The eighth bit of the line control register is termed the divisor latch bit (DLAB bit). When the DLAB bit is asserted, a write or read command to THR and IER registers results in a write or read to or from the DLL and DLM registers, respectively.

The time base of the UART may be divided, to allow for applications that demand slower speed. A divisor (least significant byte and most significant byte) may be entered in the DLL and DLM registers, when the DLAB bit in the LCR is asserted. The rate of the time base is divided by the divisor entered in these registers, thereby slowing the communication speed of the UART.

The modem control register (MCR) is used to send certain control signals (e.g., this register may be used to set the RTS control signal when the host CPU wants to signal the modem that it wants to send data, or this register may be used to put the port into a loop-back mode in which data that is to be transmitted is returned are received data, as well).

The line status register (LSR) is used to indicate events that may occur on the data line (e.g., received data is ready, received data corrupted by parity error, etc.).

Finally, the modem status register (MSR) is used to store various modem status indicators (e.g., an indication of a ring, an indication that the data set is ready, and indication known as clear to send, which means that the modem is ready to receive input from the PC, etc.).

As stated above, the microcontroller 220 executes firmware or software stored in a memory device 221, which causes the microcontroller to read from and write to the registers 300 as though an actual UART were present. (The memory device 221 is one example of a computer-readable medium upon which the methods disclosed herein may be stored. Other examples include magnetic or optical storage media.) Below is an example of how a real device uses the registers when a real UART is present, followed by an example describing a virtual serial port using the registers 300 in a parallel manner. The examples are intended to provide a flavor of the manner in which the microcontroller 220 can read from and write to the registers 300 to emulate the behavior of an actual COM port.

An ordinary set of COM port registers is coupled to UART. A CPU writes data to be communicated through the COM port to the transmit/hold register (mentioned above). In response, the UART generally enters the data into an internal first-in-first-out (FIFO) buffer. Thereafter, the data is removed from the FIFO buffer and transmitted, one bit at a time (i.e., the data is serialized) through a connector (such as a DB-9 connector), along a serial port transmission line, whereupon the data is received by a device (e.g., a modem) coupled to the other end of the transmission line. If the device coupled to the COM port becomes busy, it may drop the clear to send bit in the modem status register (mentioned above). This generally signals the application utilizing the COM port to stop sending data to the device. As discussed below, a virtual COM port may behave in an identical manner—in this regard and in every other regard, too.

Returning to FIG. 3, therein is depicted a virtual serial port. By this, it is meant that although serial port registers 300 exist, there exists no UART or connector associated with the registers 300. From the vantage of the CPU (not depicted), however, it is not apparent that no actual UART or connector exists. The microcontroller 220 reads from and writes to the registers 300 in a manner mimicking that of a UART with a device coupled thereto. Thus, for example, when the CPU (not depicted) writes data to the virtual COM port, it does so by writing to the transmit/hold register (THR)—the same way it writes data to an ordinary COM port. The microcontroller 220 responds by reading the data written to the transmit/hold register (THR) and communicating the data, through the LAN controller 224, and ultimately to a network 226. If the microcontroller 220 becomes busy, the microcontroller 220 may drop the clear to send bit in the modem status register (MSR), thereby signaling the CPU to desist sending data to the set of COM port registers, a mimicry of the behavior of a device coupled to a COM port. In short, the behavior of the virtual COM port registers 300, as seen from the vantage of the CPU (such as CPU 202, FIG. 2) is identical to that of an ordinary set of COM port registers.

Returning to FIG. 2 and a discussion of the structure of the integrated multifunction device 218, the integrated multifunction device 218 may also include a LAN controller 224. The LAN controller 224 includes a set of registers through which the CPU 202 interacts with the LAN controller 224 functionality. Of course, the LAN controller 224 also includes circuitry to perform low-level functionality including interfacing with the physical communication medium. The integrated multifunction device 218 may embodied as a single chip, or may be embodied as multiple chips that cooperate with one another.

The system 200 depicted in FIG. 2 makes use of the fact that some commercially available BIOSs and operating systems include an option to redirect text-mode screen data to a COM port, and to receive data from the COM port and treat it as incoming keyboard data. By making a selection in such a BIOS or operating system, the CPU 202 may either write text-mode screen data to a COM port, instead of to the screen, or may write text-mode screen data to both the screen and to a COM port. Similarly, data may be read from the COM port and treated as locally-generated keystroke data. By supplying a computing system with a virtual COM port through which access to a LAN may be obtained, serial data may be redirected through the LAN to another computer system.

If the integrated multifunction device 218 is a PCI compatible device, then the virtual serial port may be made available to a CPU by providing a configuration space that announces the presence of a serial port function in a device. For example, such a PCI compatible device includes a PCI configuration space 302, which is a set of registers including a class code register 304 and a base address register (BAR) 306. The class code register 304 contains a value identifying the sort of function provided by the device. Thus, in the context of a device providing a virtual serial port (or an ordinary serial port), the class code register 304 contains a value identifying a serial port function. The base address register 306 is provided in the configuration space 302 so that the BIOS may store therein an I/O address pointing to the COM port registers 300. During startup, the BIOS traverses each I/O bus (such as PCI bus 216) and seeks out each device. Each device found is enumerated. Furthermore, the BIOS seeks out each function offered by each device. Each function of each device is also enumerated. During this process, the BIOS stores an I/O address in the base address register of the configuration space associated with each function of each device. Based on the I/O address stored in the base address register, the BIOS and operating system can determine how to address a particular function on a particular device.

Figure 4:
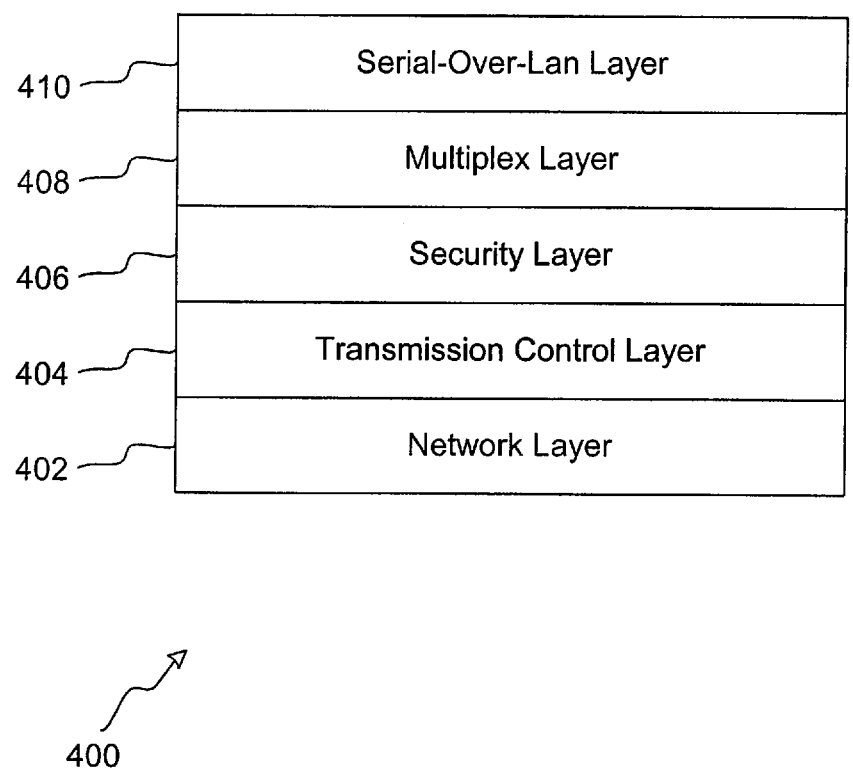
FIG. 4 depicts protocol stack that may be executed by the integrated multifunction device.

The integrated multifunction device 218 may execute a protocol stack 400, such as the one shown in FIG. 4. In FIG. 4, a given layer depicted therein provides services to layers located above it. As can be seen, the stack 400 includes a network layer 402. In one embodiment, the network layer 402 includes software/firmware providing internet protocol (IP) functionality. The IP functionality provided by the network layer 402 is made available to the transmission control layer 404. According to one embodiment, the transmission control layer 404 includes software/firmware that provides transmission control protocol (TCP) functionality. According to another embodiment, the transmission control layer 404 is software/firmware that provides user datagram protocol (UDP) functionality. The TCP or UDP functionality provided by the transmission control layer is provided to the security layer 406. The security layer 406 is an optional layer that may be wholly absent, may be activated or deactivated, or may be always activated. According to one embodiment, the security layer 406 includes software/firmware that provides transport layer security (TLS) functionality. According to another embodiment, the security layer 406 includes software/firmware that provides security defined by the Intelligent Platform Management Interface (IPMI). The security functionality provided by the security layer 406 is made available to the multiplex layer 408. The multiplex layer 408 is, again, an optional layer. It may be present on a computing system running other forms of redirection (such as IDE redirection, discussed below). The multiplex layer 408 is responsible for determining whether a data message received via the LAN controller 224 should be ultimately redirected to the set of virtual serial port registers or to another set of virtual device registers (such as a set of virtual IDE device registers). The functionality provided by the multiplex layer is made available to a serial-over-LAN layer 410. The serial-over-LAN layer 410 performs many tasks, which are aimed at the goal of receiving data from the set of virtual serial port registers and delivering them to the LAN controller, and vice versa. The serial-over-LAN 410 layer is discussed in greater detail, below.

The software/firmware making up the network layer 402 may be executed by the LAN controller 224 or by the microcontroller 220. The software/firmware making up the other layers 404-410 may be executed by the microcontroller 220 in the integrated multifunction device 218.

In operation, the serial-over-LAN layer 410 receives data from the registers 300, and packages the data therein into commands that are passed downwardly through the protocol stack, destined to be received by a management console (discussed below). As the protocol stack is executed, the commands are packetized and ultimately transmitted through the network, eventually being received by the aforementioned management console.

The management console (not depicted) is a computer system that communicates with the managed computing system 200 (FIG. 2). The management console runs an identical protocol stack (such as 400), so that it can properly interpret the commands received from the managed computing system 200. Consequently, IT personnel at the management console are able to view text-mode screen data redirected from the managed computing system 200. Further, IT personnel can enter keyboard data at the management console, and the management console communicates the data through the network to the managed computing system 200, whereupon it is received by the integrated multifunction device, and is unpacked (by the serial-over-LAN 410 layer) into the virtual COM port registers 300. The BIOS or operating system being executed by the CPU 202 of the managed computing system 200 then receives the data from the virtual serial port registers 300 and treats the data as incoming keystroke data. In this way, remote IT personnel located at the management console are able to diagnose problems and reconfigure the managed computing system 200 without having to be physically present at the system. The management console can also send flow control signals (this is discussed in more detail, below), such as data carrier detected (DCD), data set ready (DSR), ring indicated (RI), etc.

Figure 5:
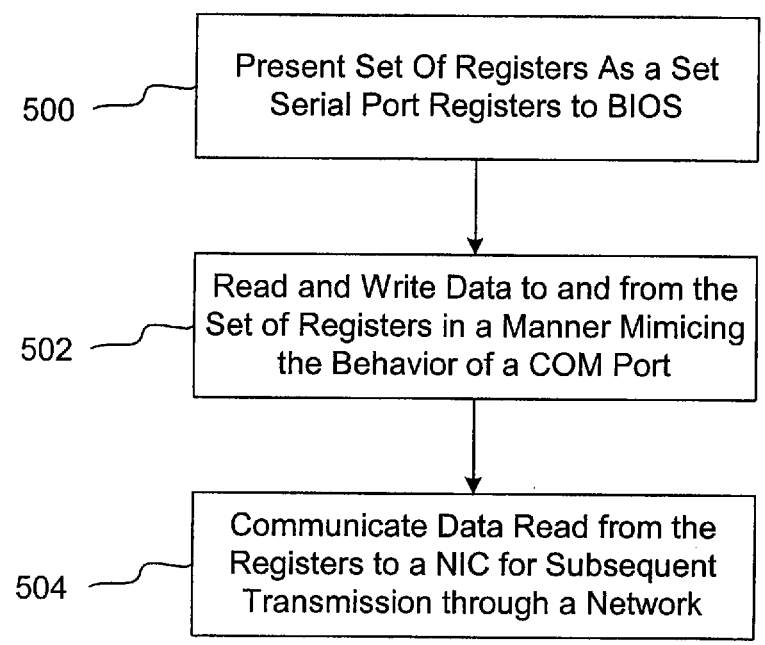
FIG. 5 depicts a method for provision of a virtual serial port, according to one embodiment of the present invention.

As shown in FIG. 5, a managed computing system (such as computing system 200) executes the following acts. First, as depicted by operation 500, a set of registers dimensioned in size and number to mimic that of a set of serial port registers are presented to the BIOS and/or operating system executed by a CPU as an ordinary set of serial port registers. In the context of performing that task with a PCI device, this includes providing a PCI configuration space having a class code register that identifies the device as having a COM port function, and further having a base address register that can be programmed to point at the aforementioned set of registers. Next, as shown in operation 502, a microcontroller coupled to the aforementioned set of registers is programmed to read and write data to and from the registers in a manner mimicking the behavior of an ordinary COM port with a device coupled thereto. In the context of a serial-over-LAN use, this may include providing a serial-over-LAN application layer, as shown in FIG. 4, and as is discussed in greater detail, below. Finally, as shown depicted by operation 504, data read from the aforementioned set of registers is communicated to a LAN controller (or network interface chip) for communication through a network to a management console or other computing system. Of course, data received from the management console via the LAN controller is unpacked into the aforementioned registers for retrieval by the CPU. Operation 504 may include execution of a protocol stack, such as that shown in layers 402-408 in FIG. 4.

Figure 6:
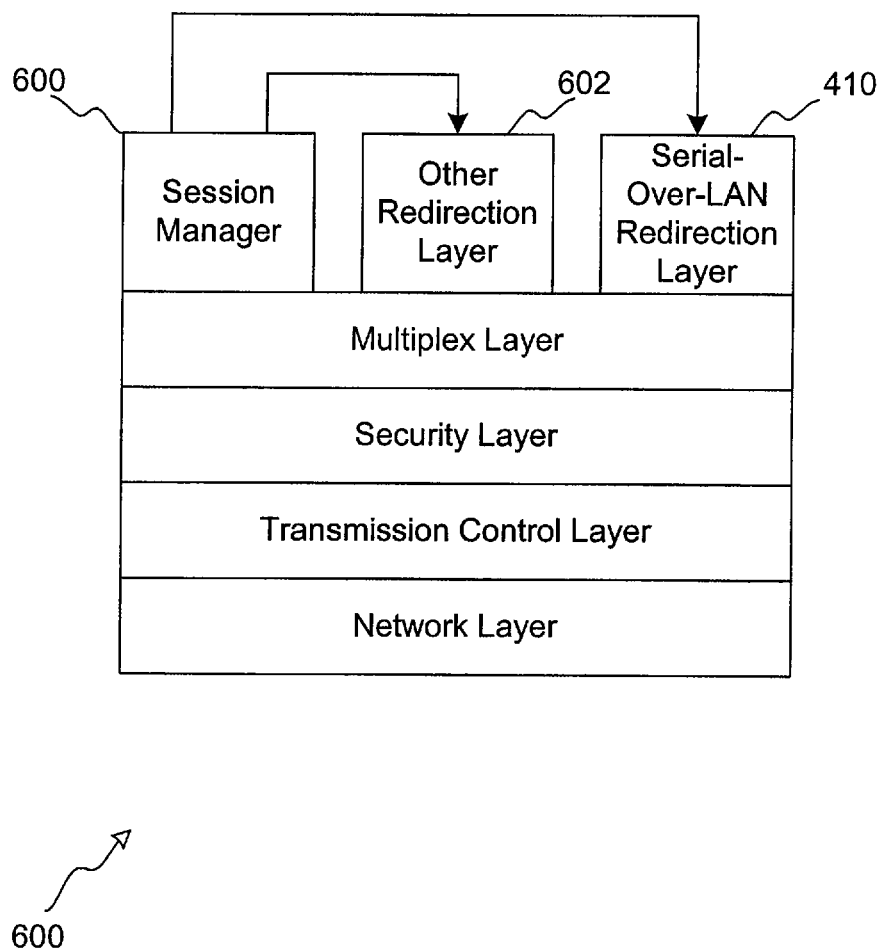
FIG. 6 depicts one possible embodiment of the protocol stack depicted in FIG. 4.

FIG. 6 depicts one possible embodiment of the protocol stack 400 depicted in FIG. 4. As shown in FIG. 6, the serial-over-LAN layer 410 shown in FIG. 4 may be controlled by a session manager 600. Briefly, the session manager 600 is responsible for opening a redirection session (such as a serial-over-LAN redirection session), and is responsible for ensuring that fewer than some maximum number of such sessions are open (example: limit the number of simultaneous serial-over-LAN sessions to only a single such session). The operation of the session manager 600 is discussed in more detail, below.

As can also be seen from FIG. 6, a redirection session other than serial-over-LAN may also be supported by the multifunction integrated device 218. For example, the integrated multifunction device 218 may also provide a set of registers dimensioned in size and number to be identical to that of a set of integrated drive electronics (IDE) device registers. In other words, a virtual IDE device may be provided by the integrated multifunction device 218. The microcontroller 220 in the integrated multifunction device 218 may be programmed to cooperate with a remote management console, so that the microcontroller 218 reads from and writes to the set of registers in a manner mimicking the behavior of an ordinary IDE device. Such functionality is provided by the redirection layer 602, which provides redirection functionality other than serial-over-LAN redirection.

Figure 7:
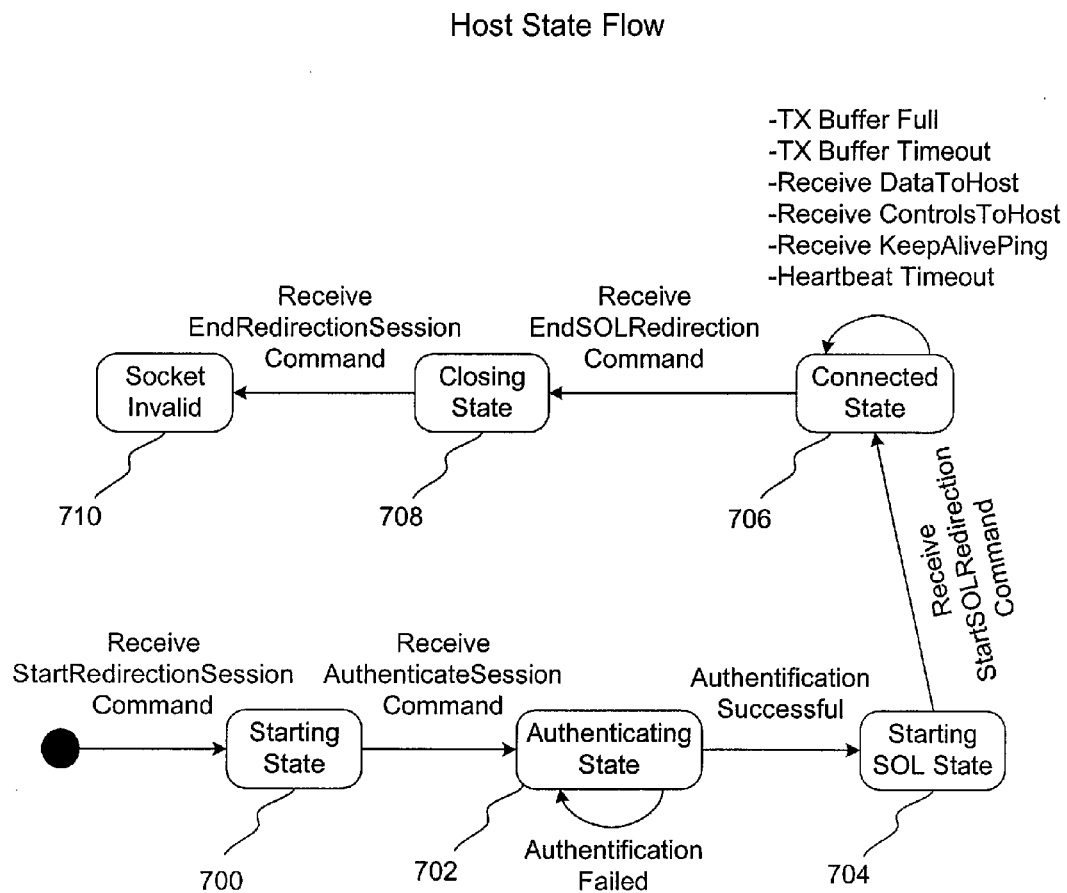
FIG. 7 depicts the joint flow of operation of the session manager and the serial-over-LAN layer.

FIG. 7 depicts the joint flow of operation of the session manager 600 and the serial-over-LAN layer 410. As shown in FIG. 7, the session manager 600 may be initially set in motion by the reception of a StartRedirectionSession command from management console. (Of course, commands from the management console are received by way of the LAN controller 224 in the integrated multifunction device 218). The StartRedirectionSession command is the first command that the management console generally sends to the computing system 200 under management. Basically, this command identifies what kind of redirection session should be started (i.e., should a serial-over-LAN session be started, or should another form of redirection session, such as an IDE redirection session, be started). Thus, the StartRedirectionSession command may include at least one argument, in order to fulfill its role of identifying the sort of redirection session to be started.

The StartRedirectionSession command is received by the session manager 600, which causes the session manager 600 to transition to the starting state 700. During the starting state 700, the session manager 600 determines whether opening the requested redirection session would result in more than a maximum number of permitted sessions to be opened. If so, the session manager 600 does not open the requested redirection session. On the other hand, if opening the requested session would not result in more than a maximum number of permitted sessions, the session manager 600 continues forward in its procedure to open a session. Either way, the session manager 600 replies to the management console by sending a StartRedirectionSessionReply message. This message indicates whether the maximum number of redirection sessions is already open, and also indicates whether the particular variety of redirection session requested by the management console is supported by the computing system under management 200.

The session manager 600 remains in the starting state 700 until it receives an AuthenticateSession command from the management console, whereupon it transitions to the authenticating state 702. The AuthenticateSession command identifies a process by which the management console may identify itself, so that the managed computing system 200 can verify that the console indeed has the authority to start the redirection session. For example, the AuthenticateSession command may include arguments such as a user name and password, for the aforementioned purpose. If the authentication fails (e.g., the username or password provided by the management console is incorrect), then the session manager 600 remains in the authenticating state 702, awaiting an AuthenticateSession command with a correct username and password. An AuthenticateSessionReply message is returned to the management console indicating that the authentication failed. On the other hand, if the authentication is successful, an AuthenticateSessionReply message is returned to the management console indicating the success, and the serial-over-LAN layer 410 transitions to the starting serial-over-LAN (SOL) state 704.

Figure 8:
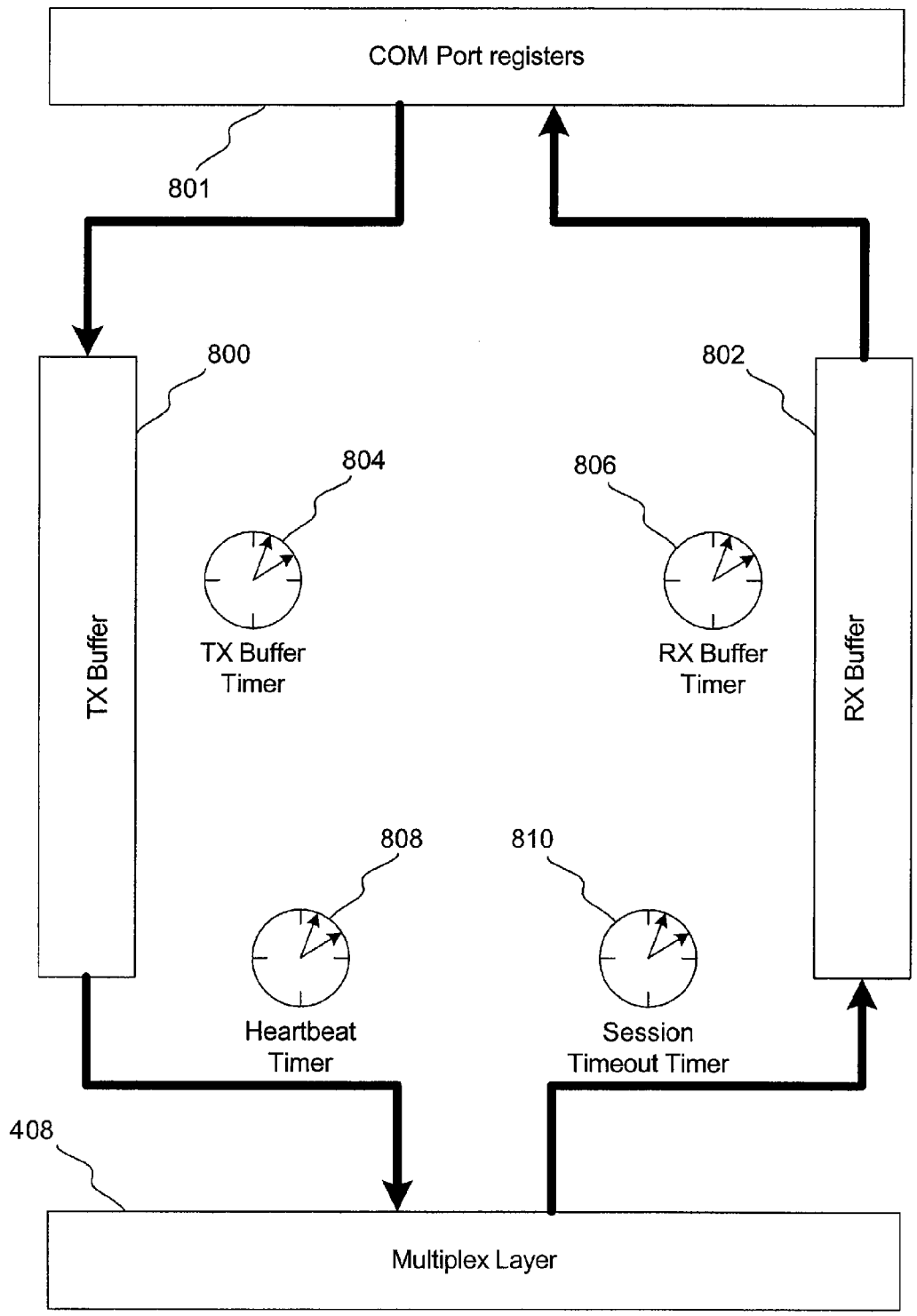
FIG. 8 depicts one possible embodiment of the general structure of the serial-over-LAN layer.

In the starting SOL state 704, the serial-over-LAN layer 410 awaits a StartSOLRedirection command from the management console. The StartSOLRedirection command tells the serial-over-LAN layer 410 that it should start forwarding serial-over-LAN messages to the management console. In other words, it marks the beginning of the serial-over-LAN session. The SartSOLRedirection command may contain certain arguments that configure the serial-over-LAN layer 410. FIG. 8 depicts the general structure of the serial-over-LAN layer 410. Briefly, the serial-over-LAN layer 410 includes a transmission buffer 800 and a reception buffer 802. The serial-over-LAN layer 410 may also include four clocks: (1) a transmission buffer timer 804; (2) a reception buffer timer 806; (3) a heartbeat timer 808; and (3) a session timeout timer 810.

During operation, redirected data from the CPU 202 is received from the COM port registers 801 (which may be a set of virtual COM port registers, as shown in FIG. 3), and stored in the transmission buffer 800. The transmission buffer 800 may be a FIFO buffer. As discussed in more detail below, upon the occurrence of certain events, data is removed from the transmission buffer 800, packaged into commands, and communicated to the multiplex layer 408 for communication to the management console. The length of the transmission buffer 800 may be determined by an argument of the Start-SOLRedirection command.

Commands from the management console are received from the multiplex layer 408 and are placed into a reception buffer 802. Like the transmission buffer 800, the reception buffer 802 may be a FIFO buffer. As discussed in more detail below, upon the occurrence of certain events, commands are removed from the reception buffer 802 and unpacked into the COM port registers 801. Such commands may contain data bytes to be conveyed to the host CPU 202 via the RBR register, or may contain control signals conveyed via the MSR register.

The serial-over-LAN layer 410 includes a transmission buffer timer 804. When the transmission buffer timer 804 expires, data in the transmission buffer 800 is removed and packaged into commands that are communicated to the multiplex layer 808. The StartSOLRedirection command may configure the transmission buffer timer 804 to expire after a selected period of time (e.g., the StartSOLRedirection command may configure the transmission buffer 804 to expire after 10 ms or 20 ms). Data is also removed from the transmission buffer 800 when the buffer 800 becomes full. Each time the transmission buffer 800 is emptied, the transmission buffer timer 804 is reset.

As mentioned above, the serial-over-LAN layer 410 also includes a reception buffer 802. When the reception buffer timer 806 elapses, data bytes in the reception buffer 802 are dropped, because the host appears to be too slow to read the data. The StartSOLRedirection command may configure the reception buffer timer 806 to elapse after a selected period of time. Data is also removed from the reception buffer 802 when the buffer 802 becomes full. Each time the reception buffer 802 is emptied, the reception buffer timer 806 is reset.

The StartSOLRedirection command may also configure the heartbeat timer 808 to expire after a chosen period of time. Upon expiration of the heartbeat timer 808, a heartbeat message is communicated to the management console to indicate that the serial-over-LAN session is still active. The heartbeat timer 808 is reset every time a heartbeat message is sent or any other message/command is sent to the management console.

The StartSOLRedirection command may also configure the session timeout timer 810 to expire after a chosen period of time. Upon expiration of the session timeout timer 810, the serial-over-LAN session is terminated, as it is inferred that the management console is no longer in communication with the computing system under management 200 for one reason or another. The session timeout timer 810 is reset every time a message is received from the management console.

The StartSOLRedirection command may also set an initial value for a console sequence number. Each subsequent message from the management console includes a console sequence number, with each successive message containing a sequence number that has been incremented by one. The console sequence number ensures that its messages are received and acted upon in the correct order at the managed computing system 200.

Upon reception of the StartSOLRedirection command, the serial-over-LAN layer 410 transitions from the starting SOL state 704 to the connected state 706. To indicate that such a transition has been made, a StartSOLRedirectionReply message is sent to the management console. The StartSOLRedirectionReply message informs the management console that the serial-over-LAN session has started. Additionally, it may indicate the size of the reception buffer 802. The management console should not send data in blocks larger than the size of the reception buffer 802, because the serial-over-LAN layer 410 would not be able to enter such a block of data into the buffer 802.

Although the state transition flow depicted in FIG. 7 describes the management console initiating a serial-over-LAN session, a managed system 200 may also initiate a session. In such a scenario, the managed system 200 may transmit the StartRedirectionSession and StartSOLRedirection commands to the management console, instead of the management console transmitting such commands to the managed system 200.

During the tenure of the connected state 706, the serial-over-LAN layer 410 awaits the occurrence of certain events. In response to these events, the serial-over-LAN layer 410 reacts as depicted in FIG. 9.

As discussed briefly above, whenever the transmission buffer 800 becomes full, or whenever the transmission buffer timer 804 elapses, the connected state 706 transitions from an awaiting event operation 900 to a send DataFromHost message operation 902. During this operation 902, a DataFromHost message is sent from the serial-over-LAN layer 410 to the multiplex layer 408, for ultimate delivery to the management console. The DataFromHost message communicates the data retrieved from the transmission buffer 800 to the management console, using a message type identifier to identify the block of data as being redirected data (such as redirected text-mode screen data), as opposed to some other type of data, such as control data from the COM port registers 801. After sending the DataFromHost message to the multiplex layer 408, the connected state 706 returns to the awaiting event operation 900.

Figure 9:
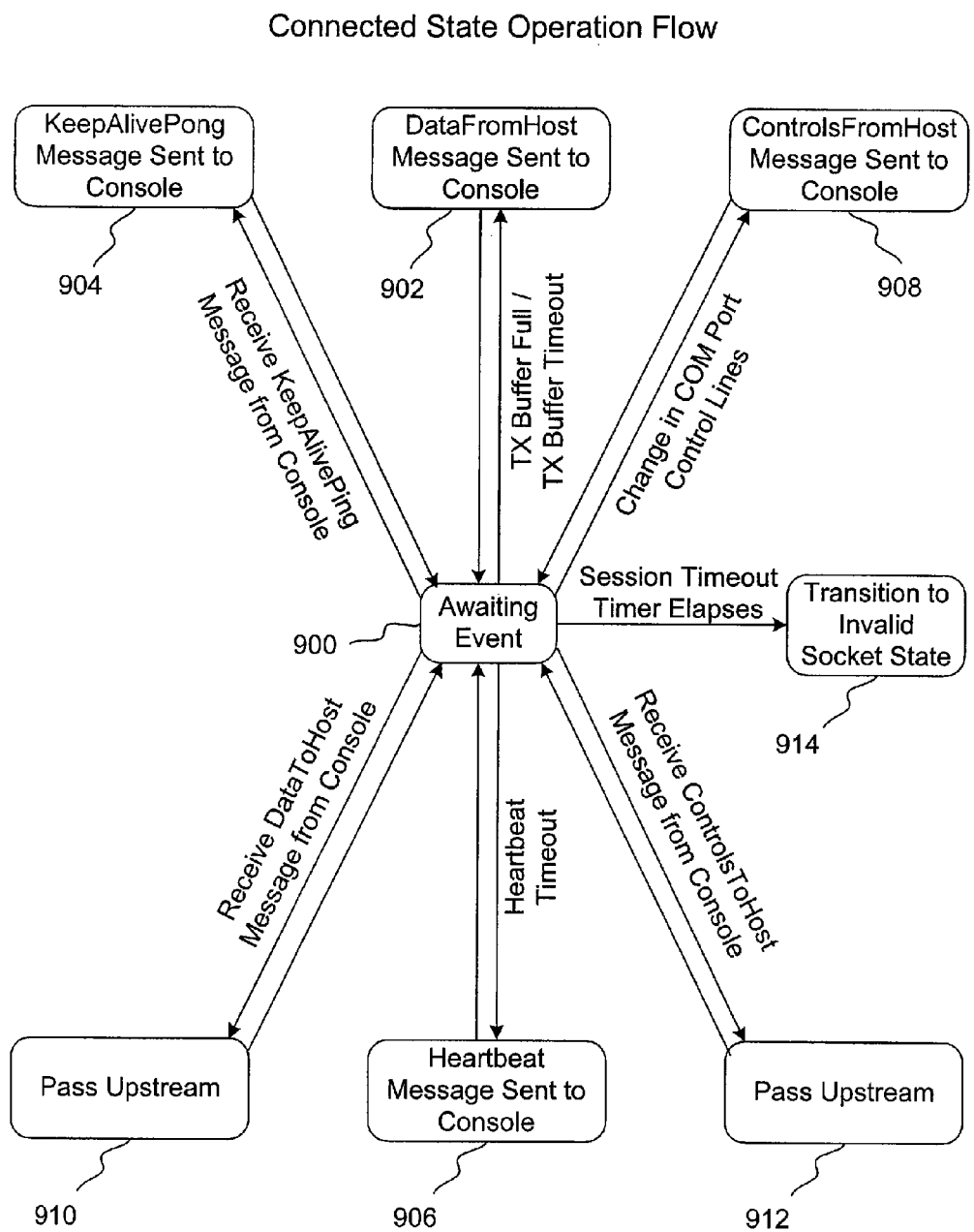
FIG. 9 depicts one possible embodiment of the operational flow of the connected state depicted in FIG. 7.

As shown in FIG. 9, the management console may transmit a KeepAlivePing message. The management console may send such a message to the managed computing system 200 when a given period of time has passed without either receiving a message from the system 200 or sending a message to the system 200. In response to reception of a KeepAlivePing message, the connected state 706 transitions from the awaiting event operation 900 to the send KeepAlivePong message operation 904. During this operation 904, a KeepAlivePong message is returned to the management console (by way of the multiplex layer 408). After transmission of the KeepAlivePong message, the connected state returns to the awaiting event operation 900. By virtue of this "ping" and "pong" exchange, the management console can verify that the serial-over-LAN session is still active. If, after transmission of a KeepAlivePing message, a given period of time elapses without the management console receiving a KeepAlivePong message, the management console closes the serial-over-LAN session, based on the assumption that the session is no longer active for one reason or another.

As is also shown in FIG. 9, upon the heartbeat timer 808 elapsing, the connected state 706 transitions from the awaiting event operation 900 to the send heartbeat message operation 906. This message serves a similar purpose to that of the KeepAlivePong, i.e., it confirms to the management console that the redirection session is still valid. Upon transmission of heartbeat message, the connected state returns to the awaiting even operation 900.

When a COM port control line changes state, the connected state 706 transitions from the awaiting event operation 900 to the send ControlsFromHost message operation 908. During this operation 908, a ControlsFromHost message is sent to the management console. The ControlsFromHost message includes a message type identifier that indicates that the message is delivering control data (as opposed to text-mode screen data). The control data follows the message type identifier. By forwarding control data to the management console, the management console may be informed of standard COM port status information (e.g., the request to send (RTS) line in the COM port is asserted or deasserted, indicating that the CPU is not ready to transmit data, or the data terminal ready (DTR) line in the COM port is asserted or deasserted, indicating either that the CPU 202 is or is not ready to communicate).

When redirected keystroke data is received from the management console, it is embedded within a DataToHost message. Upon reception of such a message, the connected state transitions from the awaiting event operation 900 to a pass upstream operation 910. During this operation 910, the DataToHost message is unpacked, meaning that the keystroke data embedded therein is extracted and placed into the proper register within the set of COM port registers 801 for communication to the CPU 202. Alternatively, the data may also be placed into the reception buffer 802, if such an option is enabled. Upon completion of operation 910, the connected state reverts to the awaiting event operation 900.

When COM port control data is received from the management console, it is embedded within a ControlsToHost message. Upon reception of such a message, the connected state transitions from the awaiting event operation 900 to a pass upstream operation 912, as shown in FIG. 9. During this operation 912, the ControlsToHost message is unpacked, meaning that the COM port control data embedded therein is extracted and placed into the proper register (modem status register—MSR) within the set of COM port registers 801 for communication to the CPU 202. Upon completion of operation 912, the connected state reverts to the awaiting event operation 900.

As mentioned above briefly, the serial-over-LAN layer 410 includes a session timeout timer 810. The session timeout timer 810 is reset every time a message is received from the management console. Should the session timeout timer 810 expire, the serial-over-LAN layer 410 transitions to the socket invalid state 710 (see FIG. 7), as shown by operation 914. The session timeout timer 810 allows the managed computing system 200 to infer that the redirection session has been compromised in some fashion (e.g., the communication link has been lost, or the management console has crashed, etc.), and to respond by invalidating the redirection session.

When finally the IT professional at the management console has completed his or her remote diagnosis or configuration work upon the managed computing system 200, he may close the redirection session. The management console commands the closing of the redirection session by sending an EndSOLRedirection command, as shown in FIG. 7. The EndSOLRedirection command is received by the serial-over-LAN layer 410, and informs the layer 410 that the redirection session has ended, meaning that the layer 410 should cease forwarding any messages to the management console. Reception of the EndSOLRedirection command causes the serial-over-LAN layer 410 to transition to the closing state 708. Upon transition into the closing state 708, the serial-over-LAN layer 410 transmits an EndSOLRedirection message to the management console, which is a message that confirms to the management console that the serial-over-LAN layer 410 has ended the redirection session.

The serial-over-LAN layer remains in the closing state 708 until the reception of an EndRedirectionSession command. The EndRedirectionSession command is received by the session manager 600, and informs the session manager that the redirection session has come to an end. In response, the session manager 600 closes the communication socket that had been utilized by the serial-over-LAN layer 410 during the redirection session. Therefore, the session manager 600 transitions to a socket invalid state 710. Although not depicted, reception of a StartRedirectionSession command causes the session manager 600 to transition from the socket invalid state 710 to the starting state 700, and the aforementioned state flow commences again.

Figure 10:
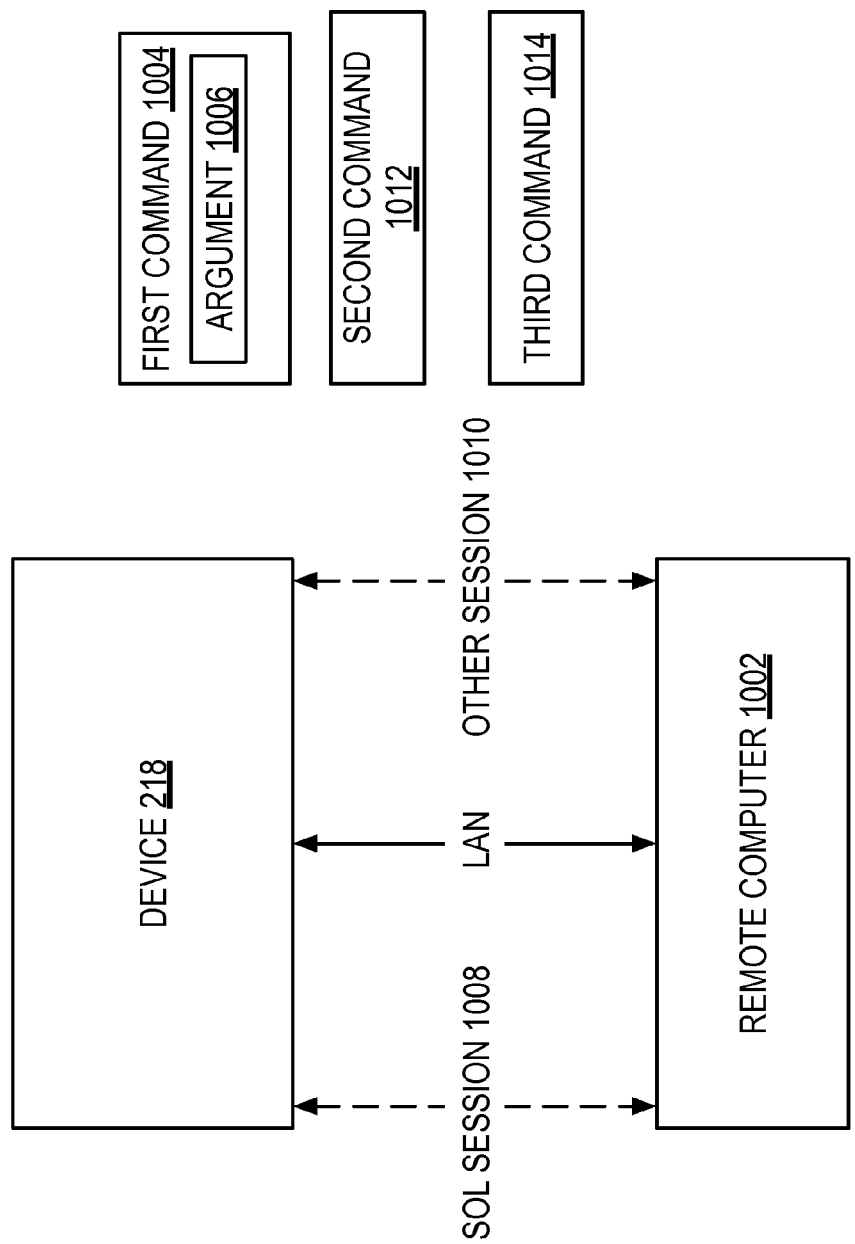
FIG. 10 illustrates features in an embodiment.

Thus, in an embodiment, the device 218 may receive from a remote computer 1002 (via network 226) a first command 1004 for communication via the LAN with the remote computer 1002 (see FIG. 10). The first command 1004 may include at least one argument 1006 to identify the kind of redirection session that is being requested to be started (e.g., by issuing the first command 1004). The kind of redirection session that may be identified by the argument 1006 may comprise a serial-over-local area network session 1008 or another form of redirection session (e.g., IDE redirection session 1010). The serial-over-local area network redirection session 1008 may be to transmit text display data to the remote computer 1002. The text display data may be redirected, from intended reception at a serial port (e.g., COM port 226) to the serial-over-local area network session 1008. The device 218 may reply to the remote computer 1002 as to whether the kind of redirection session that is requested to be started is supported by the device 218. If the kind of redirection session that has been requested is supported by the device 218, the device 218 may open, in response, at least in part, to the first command, this kind of redirection session, unless a predetermined maximum number of permitted redirection sessions is already open. If the kind of redirection session that has been requested comprises the serial-over-local area network redirection session 1008, the device 218 also may (1) receive a second command (e.g., a stop redirecting command) 1012 from the remote computer 1002 (via network 226) to stop redirecting the text data to the serial-over-local area network session 1008, (2) stop, in response, at least in part, to the second command, the redirecting, (3) receive a third command (e.g., a close redirecting command) 1014 from the remote computer 1002 (via network 226) to close the serial-over-local area network session 1008, and (4) close, in response, at least in part, to the third command 1014, the serial-over-local area network session 1008. Conversely, if the identified redirection session (e.g., as identified by the at least one argument 1006) is unauthorized, the identified redirection session may be determined to be not permitted.

Embodiments of the invention may be implemented in one or a combination of hardware, firmware, and software. Embodiments of the invention may also be implemented as instructions stored on a machine-readable medium (such as memory device 221, shown in FIG. 2), which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disc storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus, the following claims are hereby incorporated into the detailed description, with each claim standing on its own as a separate preferred embodiment.

The claimed invention is:

1. An apparatus comprising:
a device comprising hardware, the device to be used in establishing a serial-over-local area network redirection session with a remote computer via a network and a COM port;
the redirection session involving screen data redirection to be used to facilitate remote management of the device by the remote computer;
the redirection session to transition from one state to another state, and thereafter, to a third state, and thereafter to a fourth state;
in which:
in the one state, the session has been established;
in the another state, the session has been established, involves an active connection, and utilizes a security protocol;
in the third state, the session remains valid but no active redirecting is occurring; and
in the fourth state, the session is closed.

2. The apparatus of claim 1, wherein:
prior to the one state, the redirection session is to be established, unless establishment of the redirection session would result in exceeding a maximum number of concurrent redirections.

3. The apparatus of claim 1, wherein:
the device comprises a network controller via which the redirection session is to be established.

4. The apparatus of claim 1, wherein:
the COM port is a virtual COM port.

5. An apparatus comprising:
a device comprising hardware, the device to:
(a) receive a first command to start a certain type of redirection session, the certain type of redirection session being selected from a plurality of possible types of redirection sessions that include a serial-over-local area network redirection session and a text redirection session;
(b) determine whether the certain redirection session is permitted; and
(c) unless the certain redirection session is determined to be not permitted, start the certain redirection session and continue the certain redirection session until other commands are received; and
in which, the other commands comprise:
a stop redirecting command to stop actively redirecting in the certain redirection session while maintaining validity of the certain redirection session; and
a close redirecting command to close the certain redirection session, the certain redirection session remaining valid until after the close redirecting command.

6. The apparatus of claim 5, wherein:
the apparatus further comprises a microcontroller and a virtual COM port.

7. The apparatus of claim 5, wherein:
the possible types of redirection sessions include an IDE redirection session.

8. The apparatus of claim 5, wherein:
the device comprises a single chip that includes a microcontroller, a virtual COM port, and a network controller, the network controller to be coupled to a network; and
the apparatus also comprises a central processing unit (CPU) coupled to the microcontroller via an input/output (I/O) bus.

9. The apparatus of claim 5, wherein:
the first and second commands are to be received from a remote computer;
if initiation of the certain redirection session is authorized, the certain redirection session is determined to be not permitted; and
the device also is to execute a security protocol to be used in the certain redirection session.

10. Machine-readable memory storing instructions that when executed by a machine result in performance of operations comprising:
using a device to establish a serial-over-local area network redirection session with a remote computer via a network and a COM port, the redirection session involving screen data redirection to be used to facilitate remote management of the device by the remote computer;
transitioning the redirection session from one state to another state, and thereafter, to a third state, and thereafter, to a fourth state;
in which:
in the one state, the session has been established;
in the another state, the session has been established, involves an active connection, and utilizes a security protocol;
in the third state, the session remains valid but no active redirecting is occurring; and
in the fourth state, the session is closed.

11. The memory of claim 10, wherein:
prior to the one state, the redirection session is to be established, unless establishment of the redirection session would result in exceeding a maximum number of concurrent redirections.

12. The memory of claim 10, wherein:
the device comprises a network controller via which the redirection session is to be established.

13. The memory of claim 10, wherein:
the COM port is a virtual COM port.

14. Machine-readable memory storing instructions that when executed by a machine result in performance of operations comprising:
(a) receiving, by a device, a first command to start a certain type of redirection session, the certain type of redirection session being selected from a plurality of possible types of redirection sessions that include a serial-over-local area network redirection session and a text redirection session;
(b) determining, by the device, whether the certain redirection session is permitted; and
(c) unless the certain redirection session is determined to be not permitted, starting the certain redirection session and continuing the certain redirection session until other commands are received by the device; and
in which, the other commands comprise:
a stop redirecting command to stop actively redirecting in the certain redirection session while maintaining validity of the certain redirection session; and a close redirecting command to close the certain redirection session, the certain redirection session remaining valid until after the close redirecting command.

15. The memory of claim 14, wherein:
the possible types of redirection sessions include an IDE redirection session.

16. The memory of claim 14, wherein:
the device comprises a single chip that includes a microcontroller, a virtual COM port, and a network controller, the network controller to be coupled to a network; and
the device is to be comprised in an apparatus that also comprises a central processing unit (CPU) coupled to the microcontroller via an input/output (I/O) bus.

17. The memory of claim 14, wherein:
the first and second commands are to be received from a remote computer;
if initiation of the certain redirection session is authorized, the certain redirection session is determined to be not permitted; and
the device also is to execute a security protocol to be used in the certain redirection session.

18. A method comprising:
using a device to establish a serial-over-local area network redirection session with a remote computer via a network and a COM port, the redirection session involving screen data redirection to be used to facilitate remote management of the device by the remote computer;
transitioning the redirection session from one state to another state, and thereafter, to a third state, and thereafter to a fourth state;
in which:
in the one state, the session has been established;
in the another state, the session has been established, involves an active connection, and utilizes a security protocol;
in the third state, the session remains valid but no active redirecting is occurring; and
in the fourth state, the session is closed.

19. The method of claim 18, wherein:
prior to the one state, the redirection session is to be established, unless establishment of the redirection session would result in exceeding a maximum number of concurrent redirections;
the device comprises a network controller via which the redirection session is to be established; and
the COM port is a virtual COM port.

* * * * *